(12) United States Patent
Chow et al.

(10) Patent No.: US 9,753,287 B2
(45) Date of Patent: Sep. 5, 2017

(54) SPECTACLE WITH INVISIBLE OPTICS

(71) Applicant: Kopin Corporation, Westborough, MA (US)

(72) Inventors: Kenny W. Y. Chow, Hong Kong (CN); Kenneth A. Kokinakis, Naples, FL (US); John C. C. Fan, Brookline, MA (US)

(73) Assignee: Kopin Corporation, Westborough, MA (US)

( * ) Notice: Subject to any disclaimer, the term of this patent is extended or adjusted under 35 U.S.C. 154(b) by 670 days.

(21) Appl. No.: 14/101,864

(22) Filed: Dec. 10, 2013

(65) Prior Publication Data

US 2016/0223820 A1 Aug. 4, 2016

Related U.S. Application Data

(60) Provisional application No. 61/736,867, filed on Dec. 13, 2012, provisional application No. 61/773,035, filed on Mar. 5, 2013.

(51) Int. Cl.
*G02B 27/01* (2006.01)
*G02C 5/04* (2006.01)
*G02C 11/00* (2006.01)

(52) U.S. Cl.
CPC ..... *G02B 27/0176* (2013.01); *G02B 27/0172* (2013.01); *G02C 5/04* (2013.01); *G02C 11/10* (2013.01); *G02B 2027/0132* (2013.01); *G02B 2027/0158* (2013.01); *G02B 2027/0178* (2013.01)

(58) Field of Classification Search
CPC .. G02C 11/10; G02C 5/04; G02B 2027/0138; G02B 2027/0178; G02B 27/017; G02B 27/0172; G02B 27/0176; G02B 2027/0132; G02B 2027/0158
See application file for complete search history.

(56) References Cited

U.S. PATENT DOCUMENTS

| 4,704,000 | A | 11/1987 | Pekar |
| 4,865,438 | A | 9/1989 | Wada |
| 4,986,649 | A | 1/1991 | Smith |
| 5,892,564 | A | 4/1999 | Rahn |

(Continued)

FOREIGN PATENT DOCUMENTS

| CN | 201628821 | 10/2010 |
| DE | 202012003317 U1 | 8/2012 |

(Continued)

OTHER PUBLICATIONS

International Search Report and Written Opinion issued in International Application No. PCT/US2013/074017, "Specticle With Invisible Optics," Date of Mailing Mar. 27, 2014.

(Continued)

*Primary Examiner* — Nelson Rosario
(74) *Attorney, Agent, or Firm* — Hamilton, Brook, Smith & Reynolds, P.C.

(57) ABSTRACT

A wearable electronic display that includes an eyewear frame having a first side frame portion. A display module with a micro-display for generating images can be mounted to the first side frame portion. The display module can have an elongate portion with an image exit window positioned for directing viewable images to a user's eye.

24 Claims, 17 Drawing Sheets

(56) References Cited

U.S. PATENT DOCUMENTS

| | | | |
|---|---|---|---|
| D432,508 S | 10/2000 | Park et al. | |
| D628,616 S | 12/2010 | Yuan | |
| D671,590 S | 11/2012 | Klinar et al. | |
| D680,152 S | 4/2013 | Olsson et al. | |
| D687,087 S | 7/2013 | Iurilli | |
| 8,542,326 B2 | 9/2013 | MacNaughton et al. | |
| D694,311 S | 11/2013 | Cho et al. | |
| 8,777,406 B2 * | 7/2014 | Sugihara | G02B 27/0176 351/158 |
| D710,928 S | 8/2014 | Heinrich et al. | |
| D716,808 S | 11/2014 | Ycom et al. | |
| D718,305 S | 11/2014 | Olsson et al. | |
| D719,568 S | 12/2014 | Heinrich et al. | |
| D719,569 S | 12/2014 | Heinrich et al. | |
| D719,570 S | 12/2014 | Heinrich et al. | |
| D719,952 S | 12/2014 | Kim et al. | |
| D724,082 S | 3/2015 | Olsson et al. | |
| D724,083 S | 3/2015 | Olsson et al. | |
| D727,317 S | 4/2015 | Olsson et al. | |
| D738,373 S | 9/2015 | Davies et al. | |
| 2003/0090439 A1 | 5/2003 | Spitzer et al. | |
| 2005/0237271 A1 | 10/2005 | Yamamoto | |
| 2010/0110368 A1 | 5/2010 | Chaum | |
| 2010/0245754 A1 | 9/2010 | Matsumoto | |
| 2010/0245757 A1 | 9/2010 | Sugihara et al. | |
| 2010/0253904 A1 * | 10/2010 | Jannard | A61B 5/1112 351/158 |
| 2012/0013843 A1 | 1/2012 | Jannard | |
| 2012/0105740 A1 | 5/2012 | Jannard et al. | |
| 2013/0044042 A1 | 2/2013 | Olsson et al. | |
| 2013/0235331 A1 * | 9/2013 | Heinrich | G02C 11/10 351/158 |
| 2014/0266986 A1 | 9/2014 | Magyari | |
| 2015/0301360 A1 * | 10/2015 | Chow | G02C 11/10 351/158 |

FOREIGN PATENT DOCUMENTS

| | | |
|---|---|---|
| EP | 0 551 781 A1 | 7/1993 |
| JP | D1470899 | 6/2013 |
| TW | D132974 | 1/2010 |
| TW | D138236 | 12/2010 |
| WO | WO 2008/076774 A2 | 6/2008 |
| WO | WO 2013/185224 | 12/2013 |
| WO | WO 2014/093284 A1 | 6/2014 |
| WO | WO 2016/077696 A1 | 5/2016 |

OTHER PUBLICATIONS

International Preliminary Report on Patentability for PCT/US2013/074017, entitled "Spectacle With Invisible Optics," mailed Jun. 25, 2015.

* cited by examiner

User looking at virtual image

User looking straight on
(not looking at virtual image)

SPECTACLE WITH INVISIBLE OPTICS

RELATED APPLICATION(S)

This application claims the benefit of U.S. Provisional Application No. 61/736,867, filed Dec. 13, 2012, and U.S. Provisional Application No. 61/773,035, filed Mar. 5, 2013. The entire teachings of the above applications are incorporated herein by reference.

BACKGROUND

Traditional head mounted displays (HMD) or video eyewear are bulky, clumsy and look odd to wear.

SUMMARY

The present invention can provide a wearable electronic display including an eyewear frame having a first side frame portion. A display module with a micro-display for generating images can be mounted to the eyewear frame. The display module can have an elongate portion with an image exit window positioned for directing viewable images to a user's eye.

In particular embodiments, the eyewear frame can have a second side frame portion, and a front frame portion connected between the first and second side frame portions. The front frame portion can have at least one of above eye and below eye frame members. The elongate portion of the display module can laterally extend generally along the level of one of the above eye and below eye frame members. The image exit window can be tilted in one of upwardly and downwardly directions for viewing. In some embodiments, the eyewear frame can have the configuration of eyeglasses, with a front frame portion having above eye and below eye frame members being upper and lower portions of two eyewear rims, respectively. The elongate portion of the display module can have a generally comparable width and/or thickness as the eyewear rims, and can extend laterally generally along the level of one of the above eye and below eye frame members of the eyewear rims with the image exit window being positioned near or at the center of an eyewear rim. The display module can have an angular shaped portion that at least a portion of which can be positioned in a corner between the first side frame portion and the front frame portion.

In some embodiments, the eyewear frame can have a center bridge having at least one of an adjustable width for providing interpupillary distance (IPD) adjustment, and an adjustable height for adjusting the height of the front frame portion relative thereto. The center bridge can include at least one slider mechanism. The front frame portion can be pivotably secured to the first side frame portion and the second side frame portion by pivots about a horizontal axis for providing tilting of the front frame portion relative to the side frame portions for angular optical axis adjustment. In some embodiments, a second display can be mounted to the eyewear frame for providing binocular viewing.

The present invention can also provide a wearable electronic display including an eyewear frame having the configuration of eyeglasses. The eyewear frame can include a front frame portion having two eyewear rims with upper and lower portions. The front frame portion can be connected between first and second side frame members. A display module can be mounted to the eyewear frame and can have a micro-display for generating images. The display module can have an angular shaped portion that at least a portion thereof is positioned in a corner between the first side frame portion and the front frame portion and can have an elongate portion with an image exit window positioned for directing viewable images to a user's eye. The elongate portion of the display module can extend laterally generally along the level of the upper portion of one eyewear rim, and can have a generally comparable thickness as the eyewear rim. The image exit window can be positioned near or at a center of the eyewear rim, and can be tilted in a downwardly direction for viewing.

The present invention can also provide a method of viewing images including wearing a wearable electronic display. The wearable electronic display can have an eyewear frame with a first side frame portion that is worn by a user. A display module with a micro-display for generating images can be mounted to the eyewear frame. Viewable images can be directed to an eye of the user from an image exit window positioned at an elongate portion of the display module.

In particular embodiments, the eyewear frame can be provided with a second side frame portion, and a front frame portion connected between the first and second side frame portions. The front frame portion can have at least one of above eye and below eye frame members. The elongate portion of the display module can be laterally extended generally along the level of one of the above eye and below eye frame members. The image exit window can be tilted in one of upwardly or downwardly directions for viewing by the eye of the user. In some embodiments, the eyewear frame can be provided with the configuration of eyeglasses, with a front frame portion having above eye and below eye frame members being upper and lower portions of two eyewear rims, respectively. The elongate portion of the display module can be provided with a generally comparable width and/or thickness as the eyewear rims, and the elongate portion of the display module can extend laterally generally along the level of one of the above eye and below eye frame members of the eyewear rims with the image exit window being positioned near or at the center of an eyewear rim. The display module can be provided with an angular shaped portion, and at least a portion thereof can be positioned in a corner between the first side frame portion and the front frame portion.

In some embodiments, the eyewear frame can have a center bridge having at least one of an adjustable width for providing interpupillary distance (IPD) adjustment, and an adjustable height for adjusting the height of the front frame portion relative thereto. The center bridge can include at least one slider mechanism. The front frame portion can be pivotably secured to the first side frame portion and the second side frame portion by pivots about a horizontal axis for providing tilting of the front frame portion relative to the side frame portions for angular optical axis adjustment. In some embodiments, a second display can be mounted to the eyewear frame for providing binocular viewing.

The present invention can also provide a method of viewing images including wearing a wearable electronic display that has an eyewear frame with the configuration of eyeglasses. The eyewear frame can include a front frame portion having two eyewear rims with upper and lower portions. The front frame portion can be connected between first and second side frame members and worn by a user. A display module can be mounted to the eyewear frame and have a micro-display for generating images. The display module can have an angular shaped portion that at least a portion thereof is positioned in a corner between the first side frame portion and the front frame portion. Viewable images can be directed to an eye of the user from an image exit window positioned at an elongate portion of the display module. The elongate portion can extend laterally generally along the level of the upper portion of one eyewear rim and have a generally comparable thickness as the eyewear rim. The image exit window can be positioned near or at a center of the eyewear rim and tilted in a downwardly direction for viewing.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7A shows the user looking straight ahead, and FIG. 7B shows the user looking at a virtual image from the display module.

DETAILED DESCRIPTION OF THE INVENTION

Figure 1:
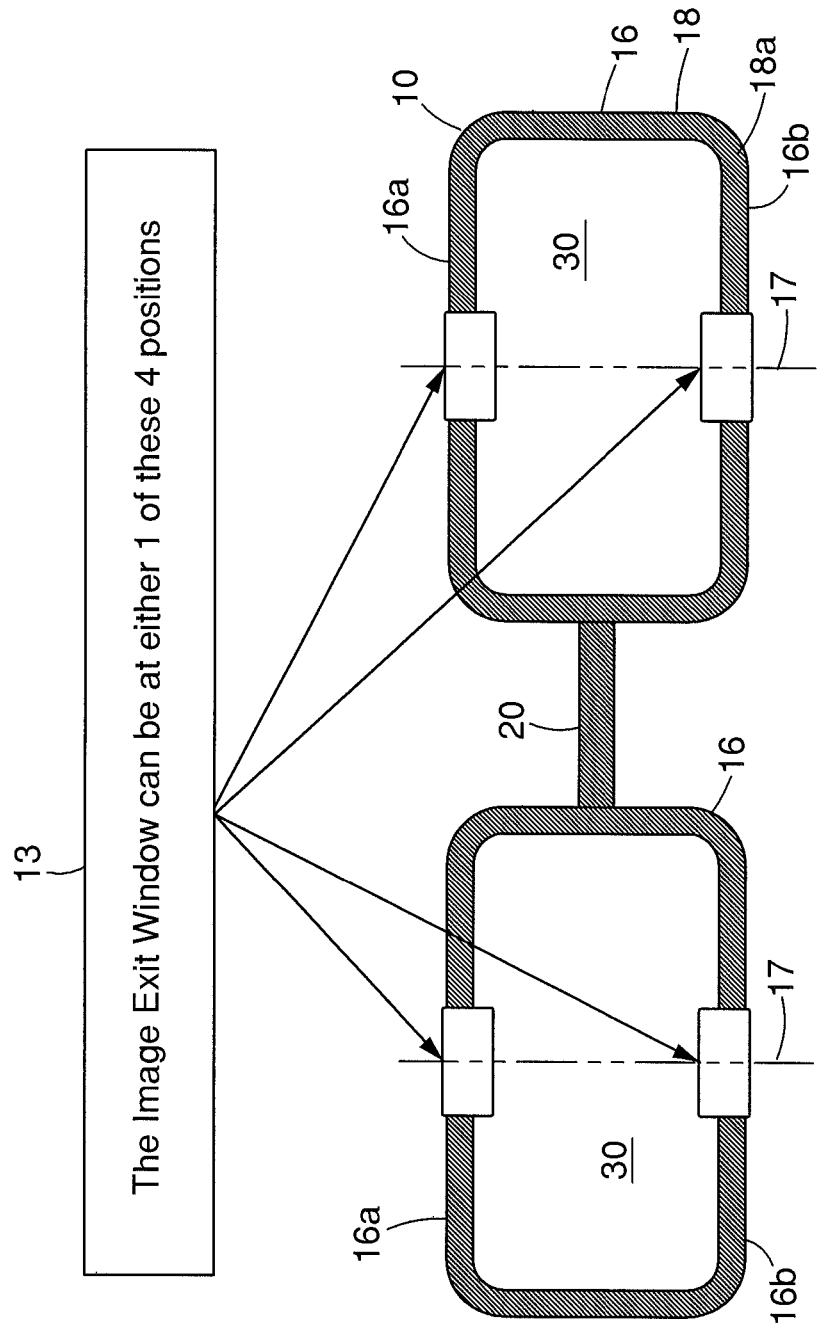
FIG. 1 is a schematic front view of an embodiment of a wearable electronic display in the present invention.
Figure 2:
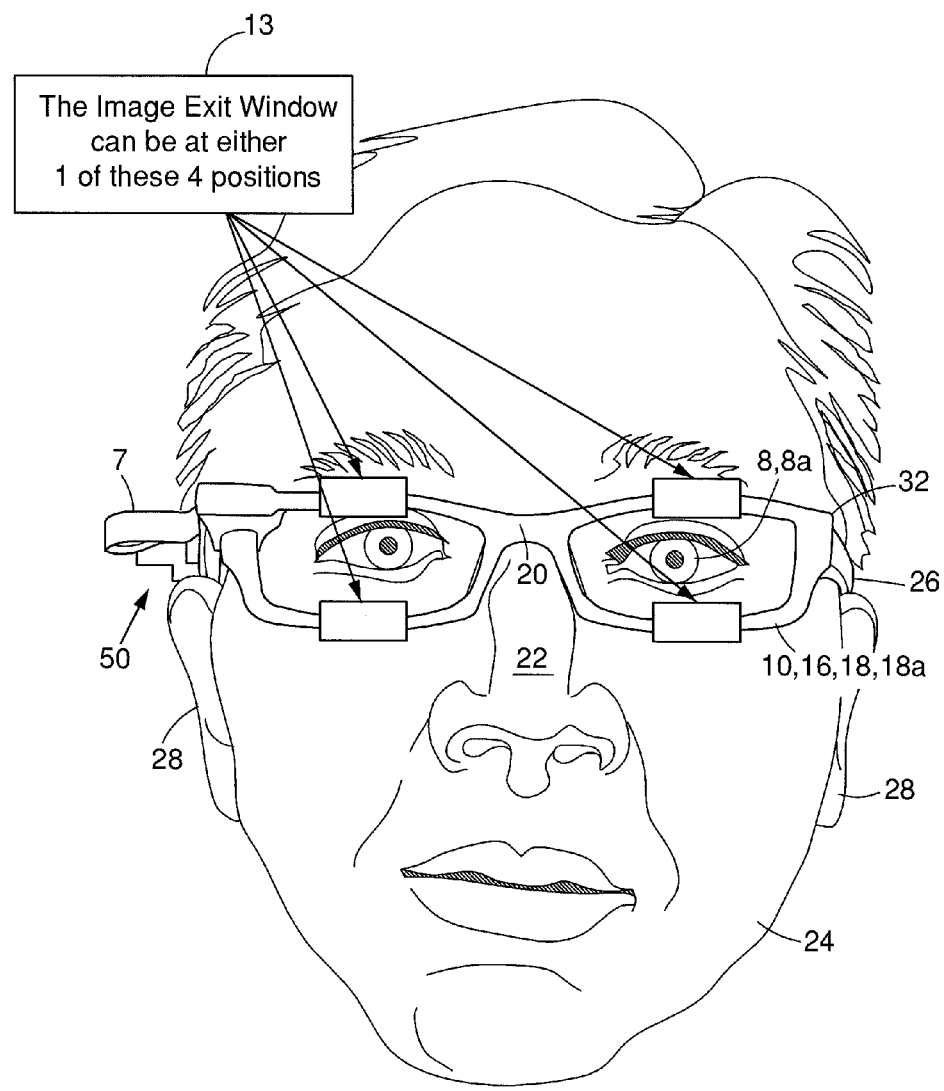
FIG. 2 is a front view of a user wearing an embodiment of the present invention electronic display.

A description of example embodiments of the invention follows.

Referring to FIGS. 1-3B, in embodiments of the present invention, a wearable spectacle, eyeglasses, or eyewear electronic display 10 can have a spectacle, eyeglass or eyewear frame 18 that can have the appearance of conventional spectacles, eyeglasses or eyewear, while also including an active optical virtual image display component, device or module 12 for viewing images. The frame 18 of the eyewear display 10 can have at least one eyeglass or eyewear rim 16, usually two connected together by a center bridge or connecting portion or member 20 for resting on the nose 22 of a user 24. Two (or first and second) side frame portions, legs, temples or stems 26 can each be connected to respective rims 16 on opposite sides of the frame 18 by hinges 32 for resting on the user's 24 ears 28. The rims 16 can contain eyeglass or eyewear lenses 30, which can be prescription or nonprescription lenses, sunglass lenses, light responsive lenses, safety lenses, etc., as desired.

Thin, small, compact or miniature optics 14 can be used to bring the image generated or from an active matrix electronic display or micro-display 6 (such as a display less than 1 inch diagonal) of the display module 12 to the eye or eyeball 8 of a user 24 through an optical image exit window 13 to form virtual images on the retina 8a. A wearable thin frame spectacle, eyeglasses or eyewear electronic display 10 can be provided which looks natural and yet can contain a display module 12 embedded therein or positioned relative to, or in a manner so that the display module 12 appears invisible or is not readily apparent or seen. The thin optics 14 can have a thickness and/or depth that is compatible with, or have similar or comparable dimensions as the rim 16 of a spectacle, eyeglass or eyewear frame 18 (such as less than 7 mm), and can form part of or appear to form, or can be incorporated into the frame of the spectacle or eyewear frame 18.

Figure 3A:
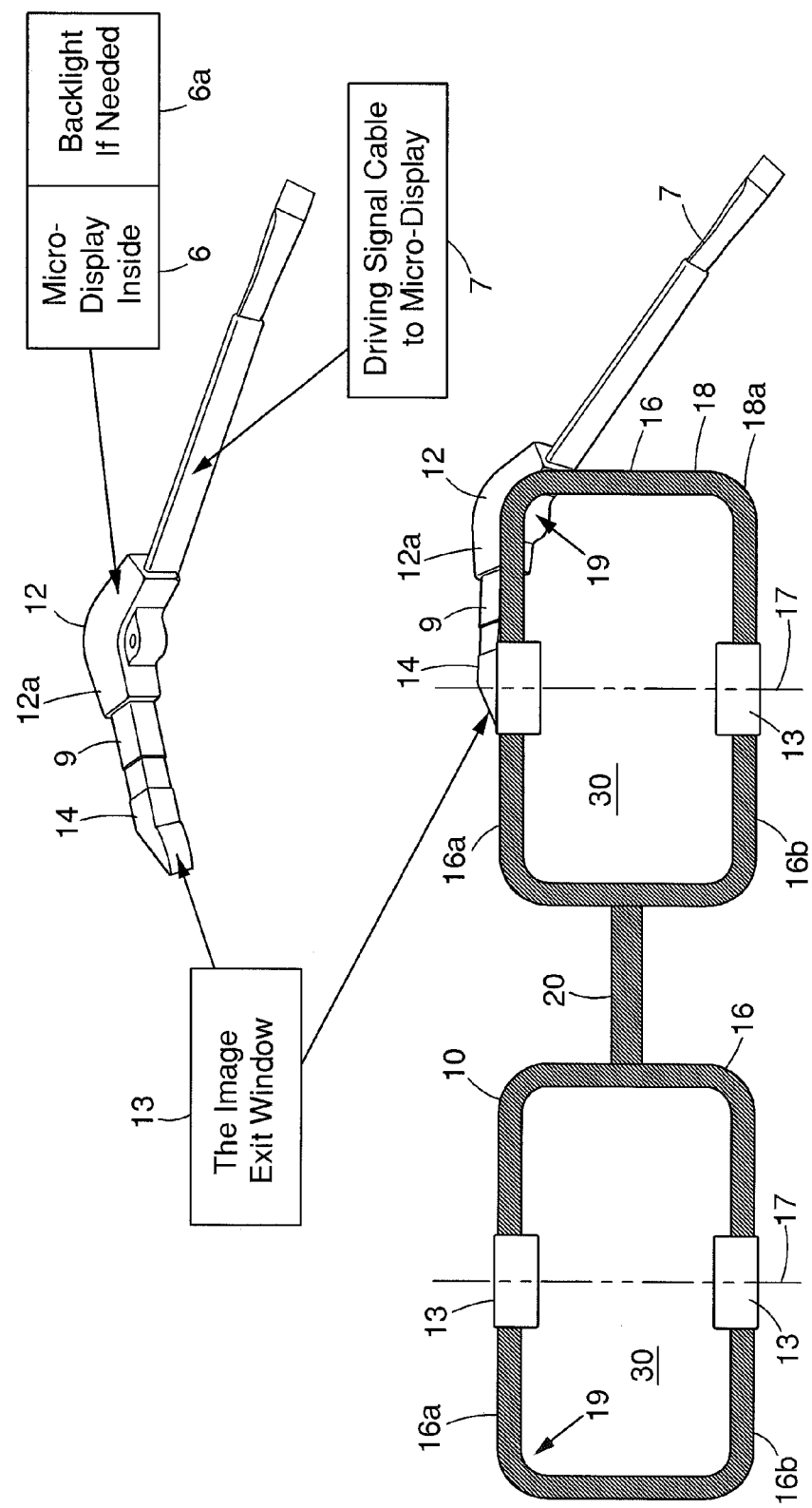
FIG. 3A is a schematic drawing of an embodiment of the present invention electronic display and virtual display module.
Figure 3B:
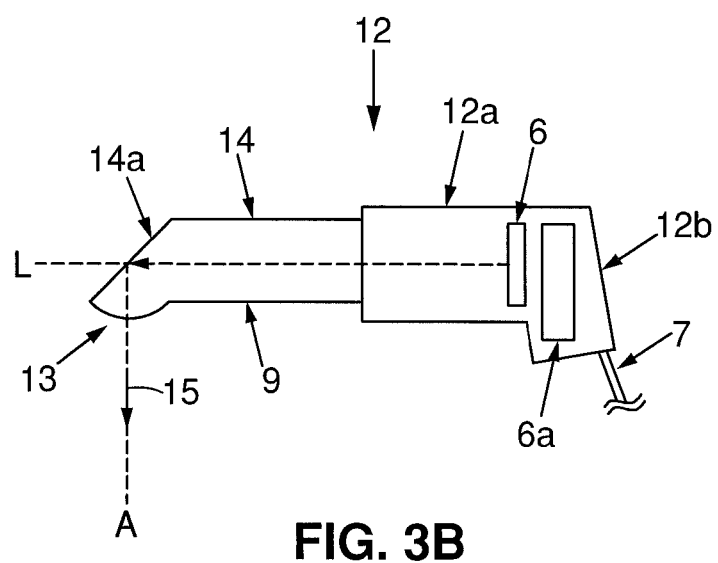
FIG. 3B is a schematic drawing of an embodiment of a virtual display module.

The display module 12 can have a housing 12a shaped as a generally angled, angular, bent, folded or corner piece, member or structure to contain the micro-display 6 and backlight source 6a (if needed), and can be or appear to be incorporated into or form part of the frame 18 of the spectacle, such as at a corner 19 of the frame 18, or at a position which is normally for the hinge 32 of the leg or side frame portion 26 connecting to the front frame portion 18a. The display module 12 can be connected to the front frame portion 18a. The image exit window 13 of the active matrix display 6 can be located near the center 17 of the upper (above eye) or lower (below eye) rims or frame members 16a and 16b of the frame 18. The width of the exit window 13 is not limited to any size as far as it does not exceed or substantially exceed the width of the rim 16 of the frame 18. The image exit window 13 can be at any of the four positions shown in FIGS. 1-3A, preferably at one of the upper frame positions. Referring to FIGS. 3A & 3B, the active-matrix micro-display 6 can be positioned within the generally angled, angular, bent folded or corner structure of the housing 12a, and a cable 7, such as a flex cable (or cables), can be connected to the micro-display 6 and backlight 6a, for providing signals to the micro-display 6. The image exit window 13 can be extended from the micro-display 6 by an extended or elongate portion 9 of the optics 14. The angled shape of the display module 12 not only can blend the display module 12 into the frame 18, but at the same time can package and position the optics 14 and the electrical connections/electronics to the micro-display in a manner that allows the image exit window 13 to be properly located or positioned at or near center 17, for desired viewing.

Figure 6A:
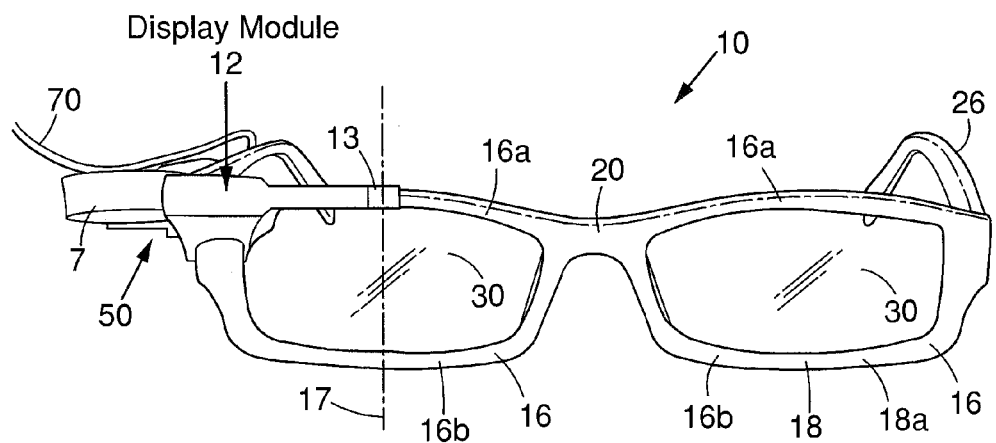
FIGS. 6A-6C depict an embodiment of the present invention electronic display from different front, top and perspective views respectively.
Figure 6B:
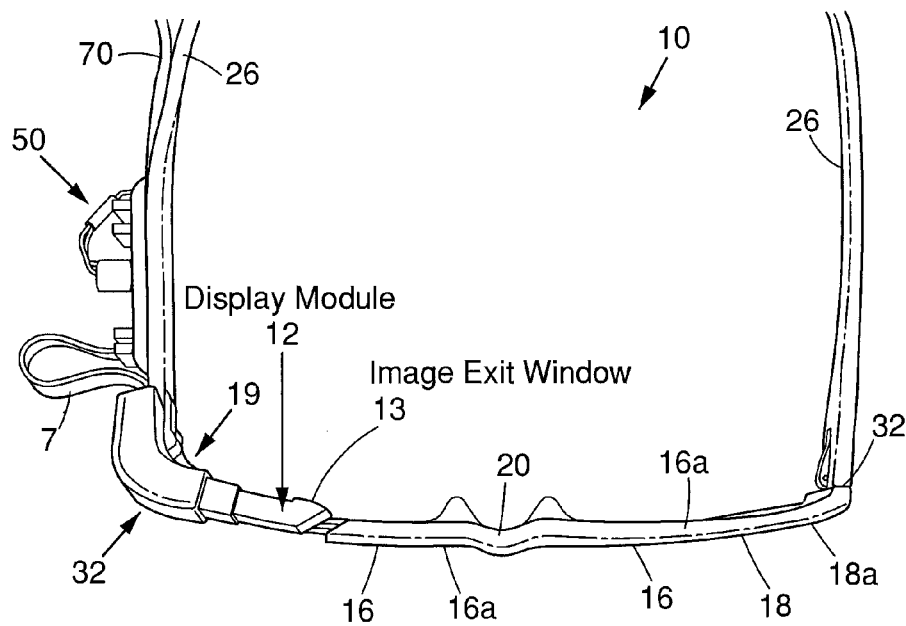
Figure 6C:
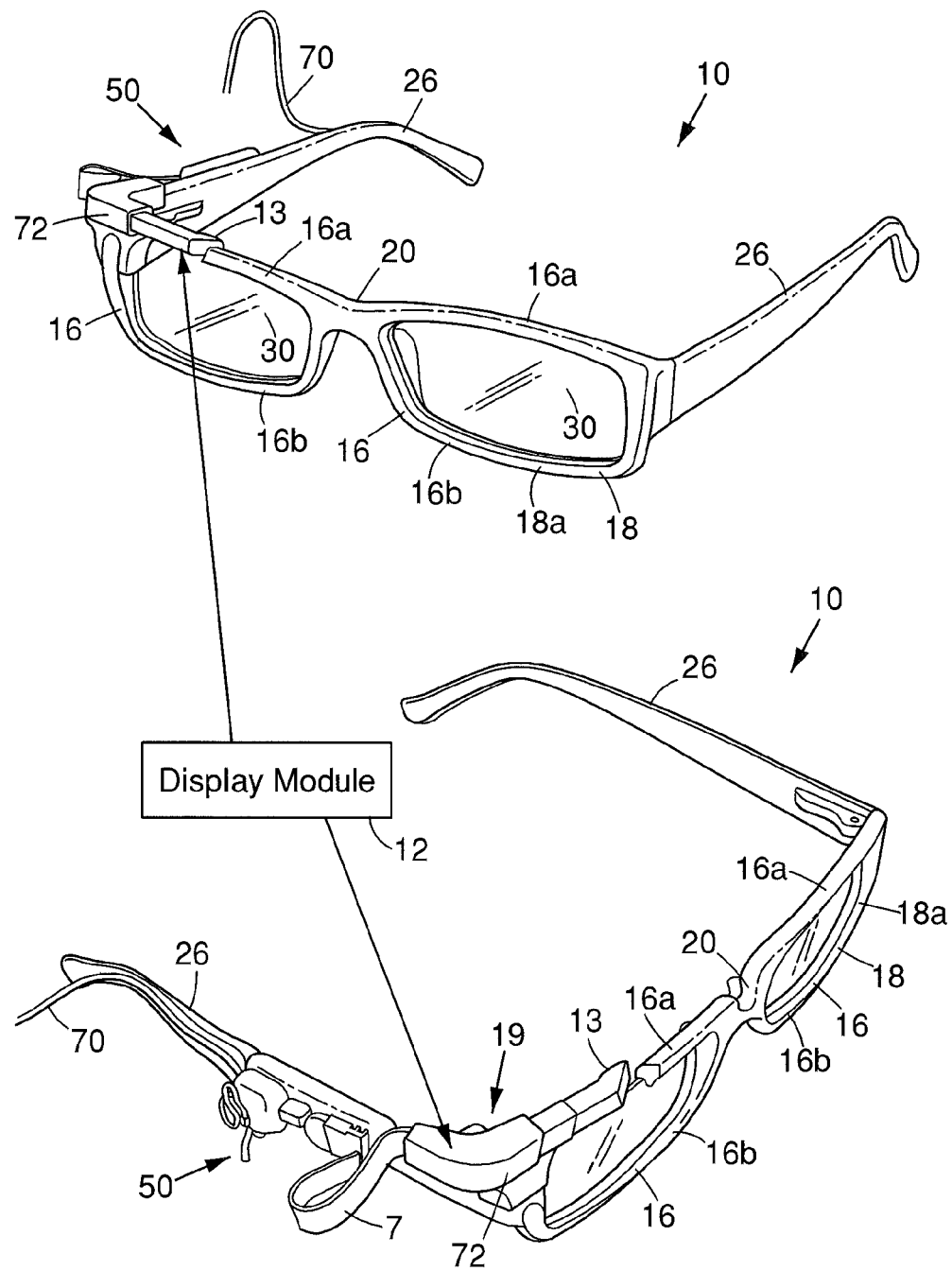

The elongate portion 9 can have a generally rectangular cross section and in some embodiments, can visually form part of the upper rim 16a, and can be positioned, located or joined behind the upper rim 16a (FIG. 3A), or can form one part of the upper rim 16a, and have a gap with the other portion of the upper rim 16a, as seen in FIG. 6C, or can be adjacent or joined thereto. If the elongate portion 9 is behind the rim 16, it can be larger as in FIG. 3A, or can be smaller or thinner than the rim 16. The thin optics can have suitable optical components, which can include lenses, mirrors, prisms, etc., for receiving an image 15 generated by the micro-display 6 and directing the image 15 longitudinally through elongate portion 9 along longitudinal axis L, which can be laterally relative to the user's 24 eye 8, and then redirected transverse to longitudinal axis L towards the user's 24 eye 8 by an optical component 14a, which can be a mirror or prism, along optical axis A, which can be a folded, redirected or bent optical axis, and include longitudinal axis L. The micro-display 6 and backlight 6a (if used) can also be positioned along axis L. In other embodiments, the backlight 6a can be positioned around the angled or bent portion 12b.

Figure 4:
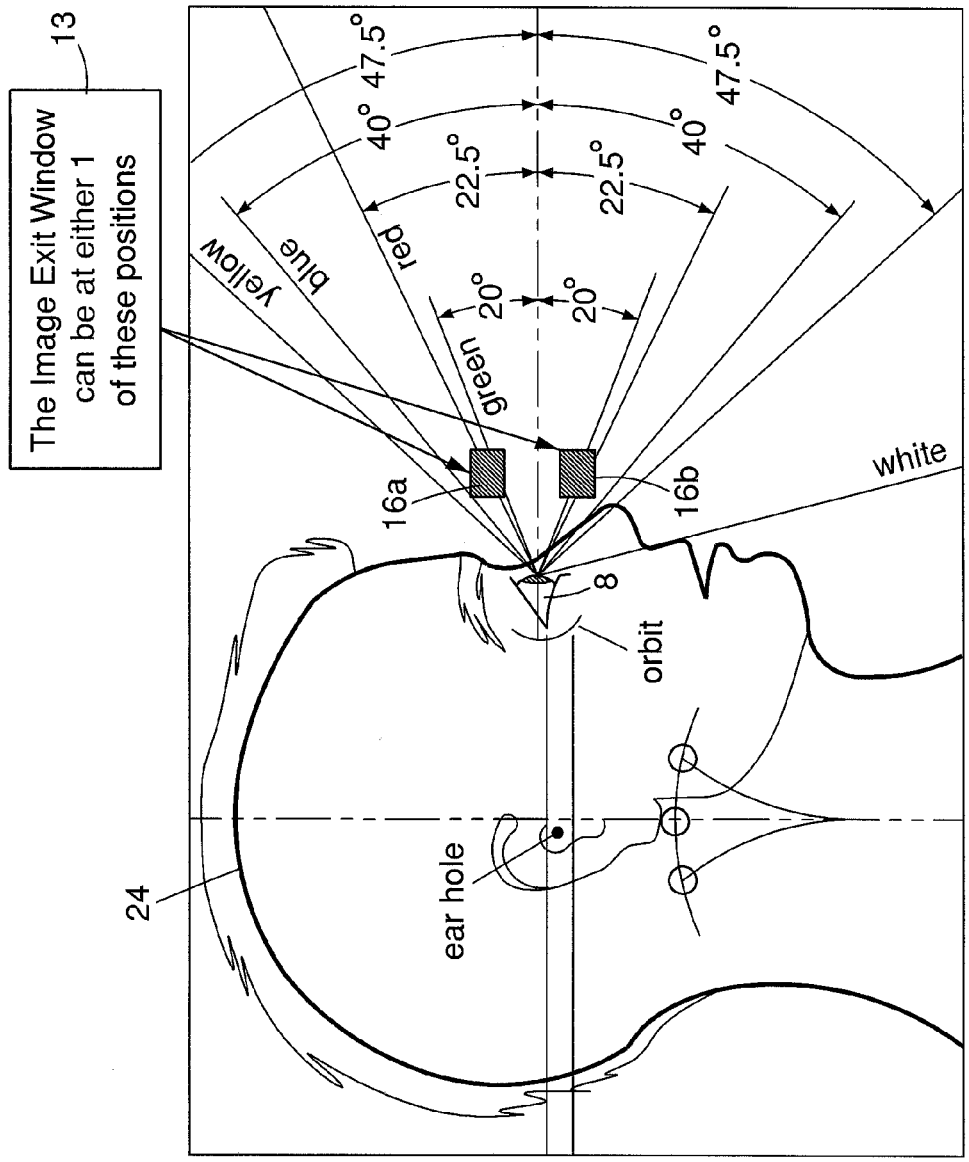
FIG. 4 is a schematic drawing showing possible upper and lower positions of the image exit window.
Figure 5:
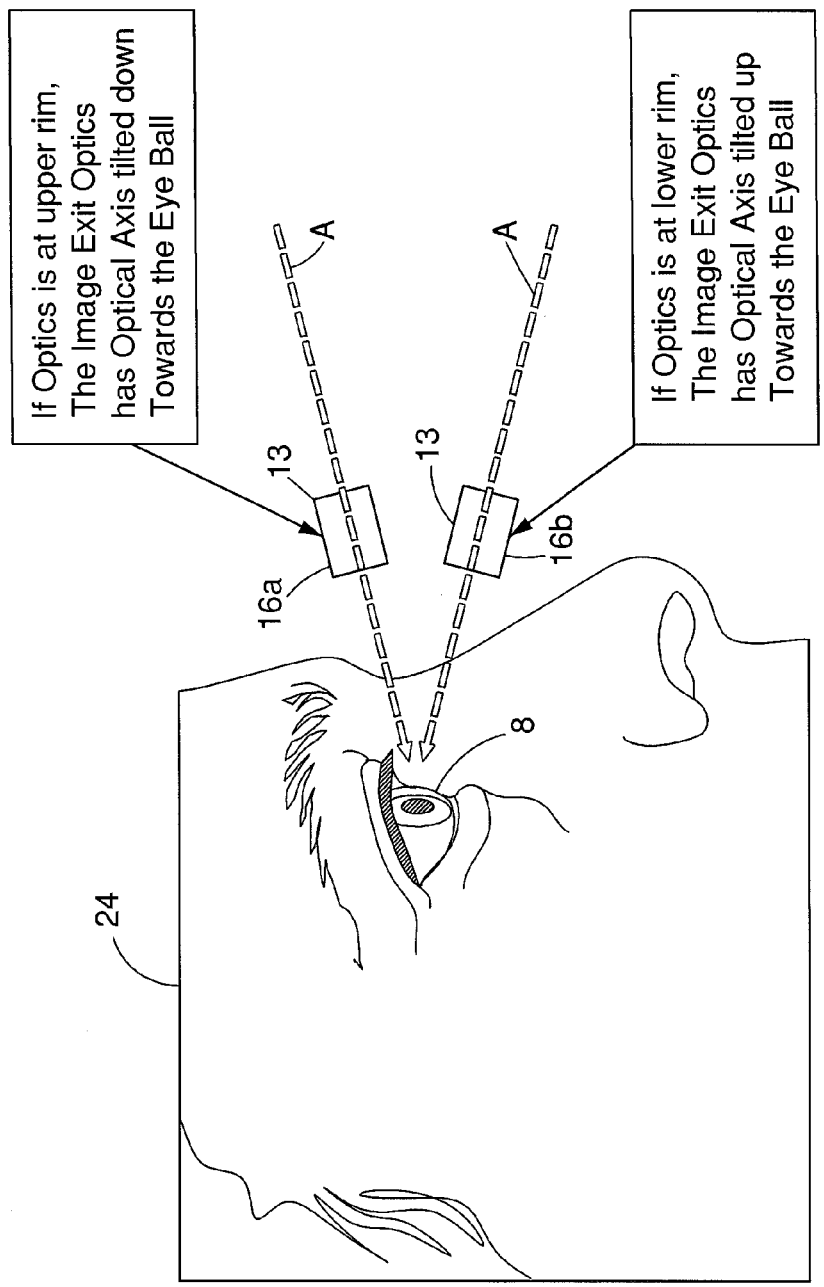
FIG. 5 is a schematic drawing of possible upper and lower optical axes of the image exit optics.

Referring to FIGS. 4 and 5, depending on the position of the image exit window 13, either upwardly or downwardly relative to the user's eyes 8, the optical axis A of the image exit optics of the display module 12 can tilt up or down towards the eyeballs 8 from the upper 16a or lower 16b rim of the spectacle or front frame portion 18a. This can facilitate comfortable viewing of the virtual image 15 which can be available in the virtual display module 12 through the exit window 13 of the optics. In addition, the optical axis A can tilt slightly laterally or slide to the left or to the right, if the image exit optics 14 is located at the right side or left side of the eye 8.

Referring to FIGS. 6A-6C, it can be seen that the display module 12 connected to the eyewear frame 18 can be incorporated or embedded into the appearance of the eyewear frame 18 without appearing bulky or apparent. The cable 7 extending from the housing 12a of the display module 12 can be electrically connected to an eyewear control system, operation system or electronics 50, for operating or controlling the display module 12. The electronics 50 can be positioned on the side frame portion 26 adjacent to the corner 19, at which the display module 12 is positioned. Appropriate electrical signals and power can be provided to the electronics 50 through a cable 70 electrically connected thereto.

Figure 7B:
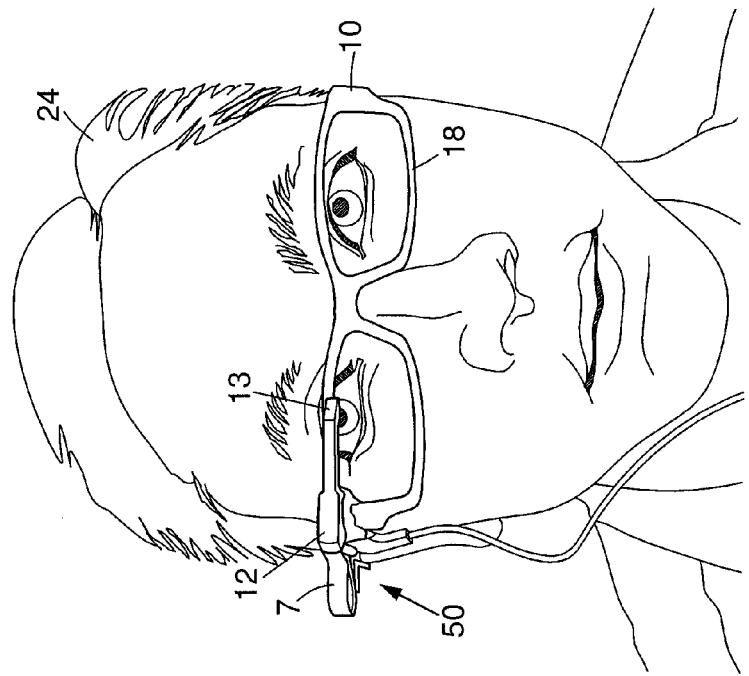
FIG. 7A-7B are front views of a user wearing an embodiment of the present invention electronic display.
Figure 7A:
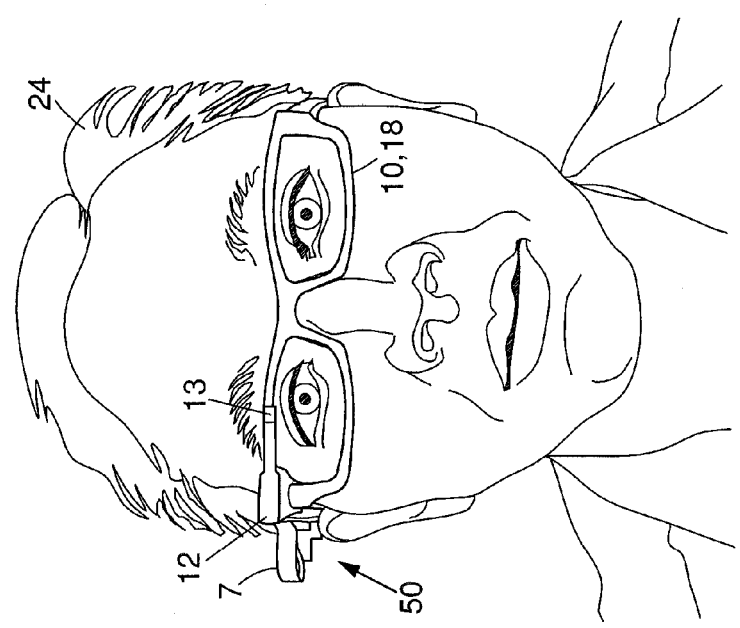

Referring to FIGS. 7A and 7B, the image exit window 13 can be positioned so that the user 24 can look straight forward through the eyewear frame 18 or spectacles without looking at a virtual image 15. When the user 24 desires to look at the virtual image 15, the user 24 can move his eyes 8 slightly to look into the image exit window 13 along center 17, for example, upwardly or downwardly and/or to one side. This can allow the user 24 wearing the eyewear display 10 to conduct normal activities, with generally normal vision, while also permitting the user 24 to view images 15 from the display module 12 when desired.

The optical display module 12 which contains the micro-display 6 can be described as being invisible for its shape can be blended into or relative to the spectacle frame structure or eyewear frame 18. The housing 12a that holds the display 6, backlight 6a assembly, and for coupling the display 6 to the optics 14, can be shaped as an angle, bend, fold or corner that can blend into the corner 19 or side bend of the frame 18. The arm of the optics or elongate portion 9 that extends or positions the exit window 13 relative to the eyeball 8 can have a thickness close the thickness of the eyewear frame 18. FIGS. 7A and 7B show an elongate portion 9 that is slightly thicker than the upper rim portion 16a of the rim 16 of the frame 18. In some embodiments, the rim 16 can be thicker and the elongate portion 9 can be thinner than the rim 16.

Figure 8:
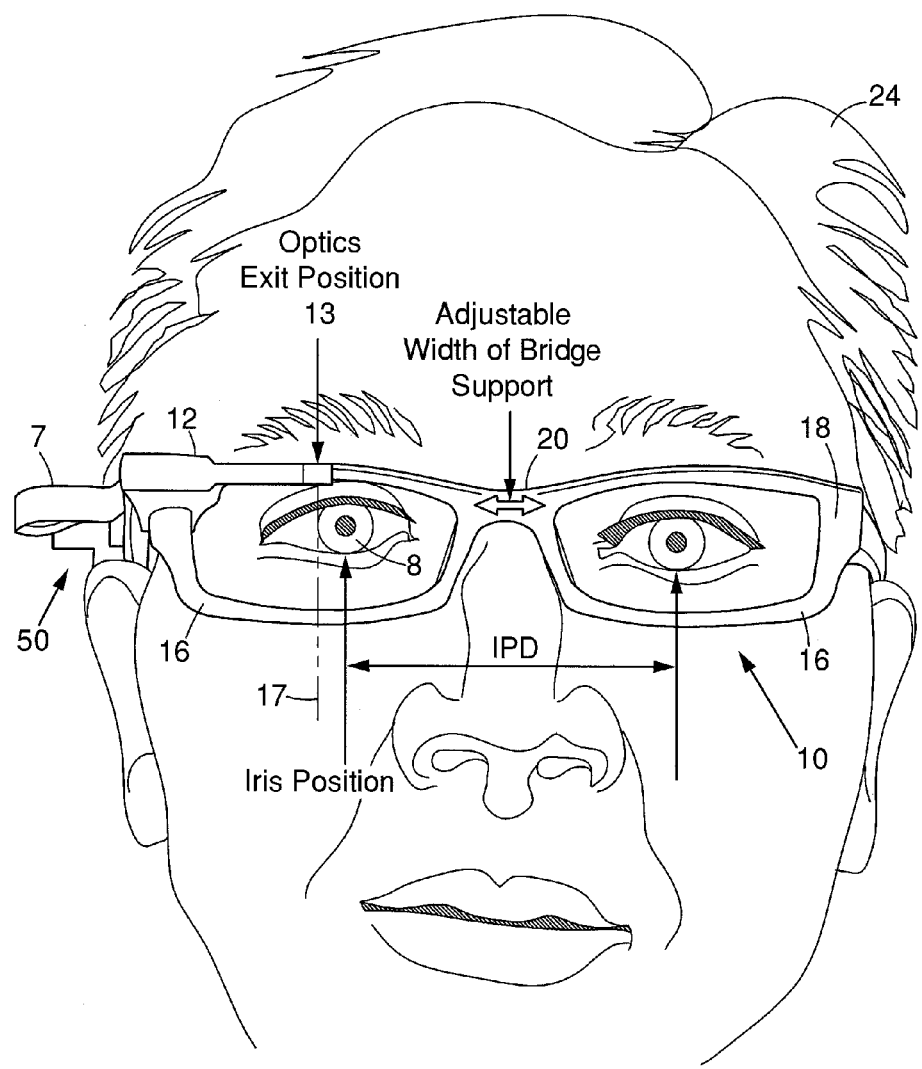
FIG. 8 is a schematic drawing of a user wearing another embodiment of the present invention electronic display.
Figure 9:
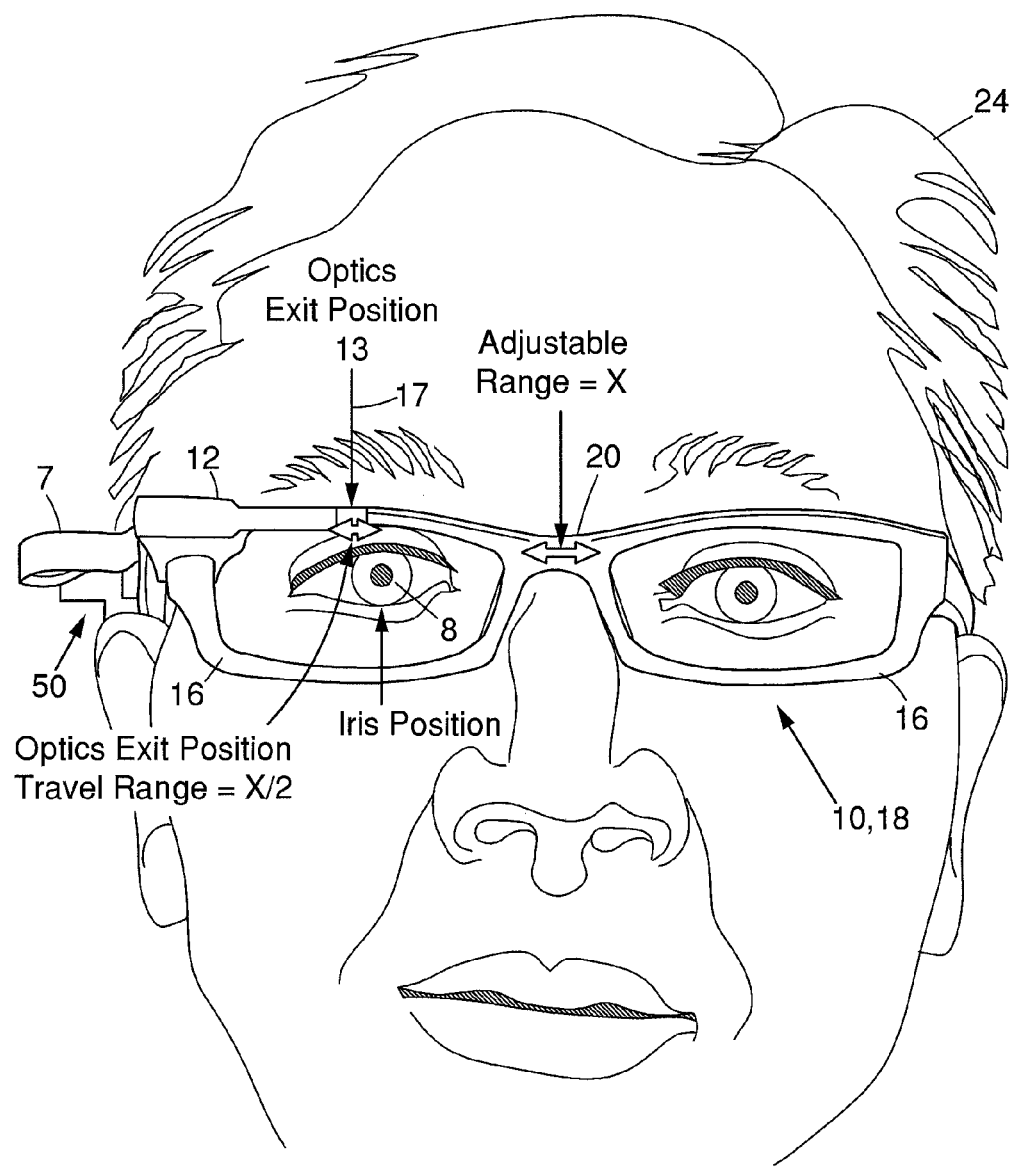
FIG. 9 is a schematic drawing depicting the adjustable range of the embodiment of FIG. 8.
Figure 10:
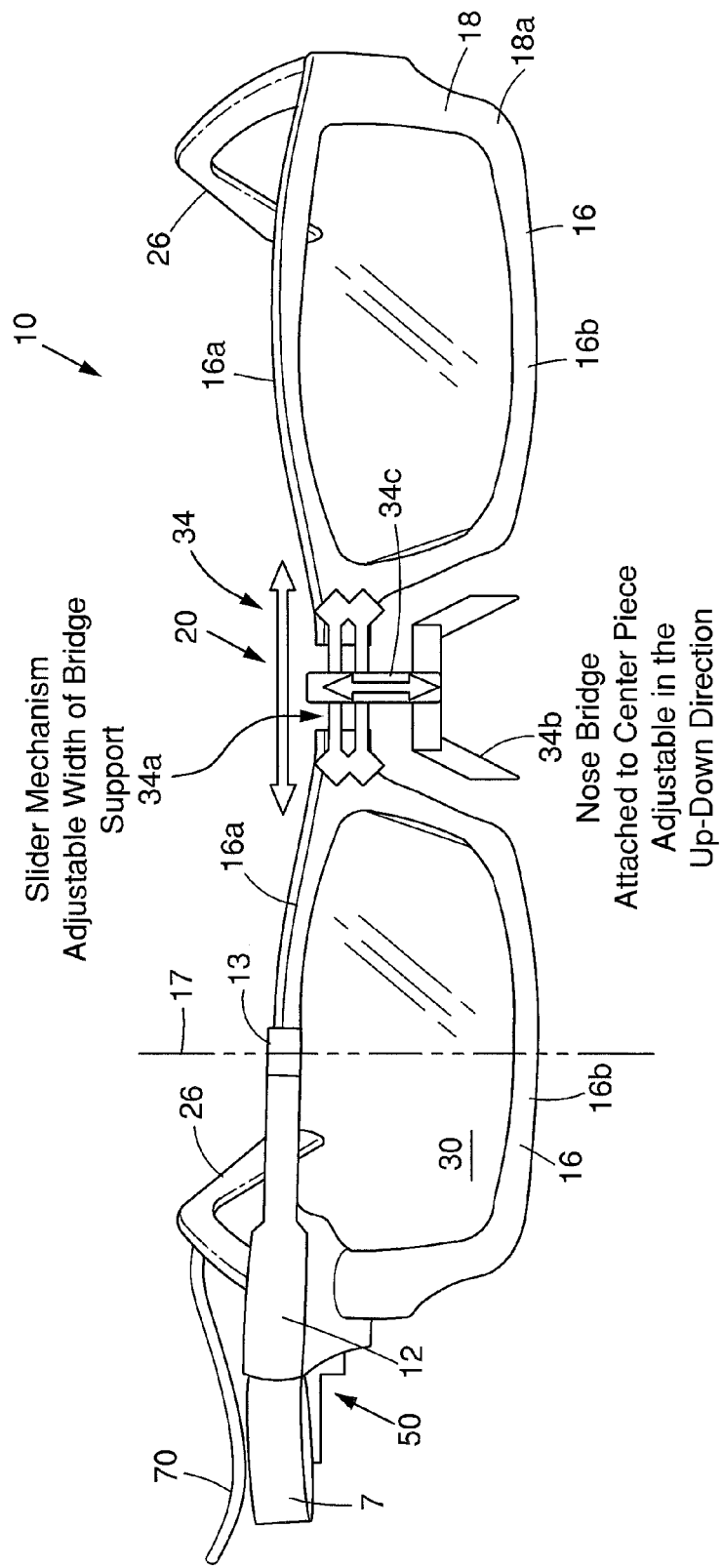
FIG. 10 is a schematic drawing of the embodiment of FIG. 8 showing nosebridge adjustment.

Referring to FIGS. 8-10, some embodiments in the present invention can have at least one adjustment mechanism 34 to facilitate adjustment of the position of the optical exit window 13 for particular users 24. The position of the optical exit window 13 can be adjusted left and right for aligning to the eyeball 8 for people with different interpupillary distances (IPD). FIG. 9 depicts the amount of adjustment for the width of a bridge 20 such that if the bridge 20 is adjusted a distance X, the travel range for the image exit window 13 relative to the user's eye is X/2. This can be implemented with adjustable mechanisms 34 such as at the center bridge 20 connected between rims 16 having an adjustable width using a sliding mechanism 34a, which can also change the distance between the two rims 16 of the frame 18. In addition, the front frame portion 18a can be moved up and down so that the optical axis A can be aligned to the eyeball 8. This can be implemented by having the center bridge 20 with a nose bridge member 34b that can be adjustable in the up and down direction such as with a sliding mechanism 34c for adjusting the height of the front frame portion 18a and rims 16 relative to the nose bridge 34b, or for adjusting to different sized noses 22. The nose bridge 34b at the center of the front frame portion 18a can be of an adjustable shape to fit different shapes and sizes of noses 22 for different people. The nose bridge 34b can be made of or have a material that is impervious to sweat so it doesn't slip forward. Rest members can be included at the corners of the frame nearest to the nose 22.

Figure 11:
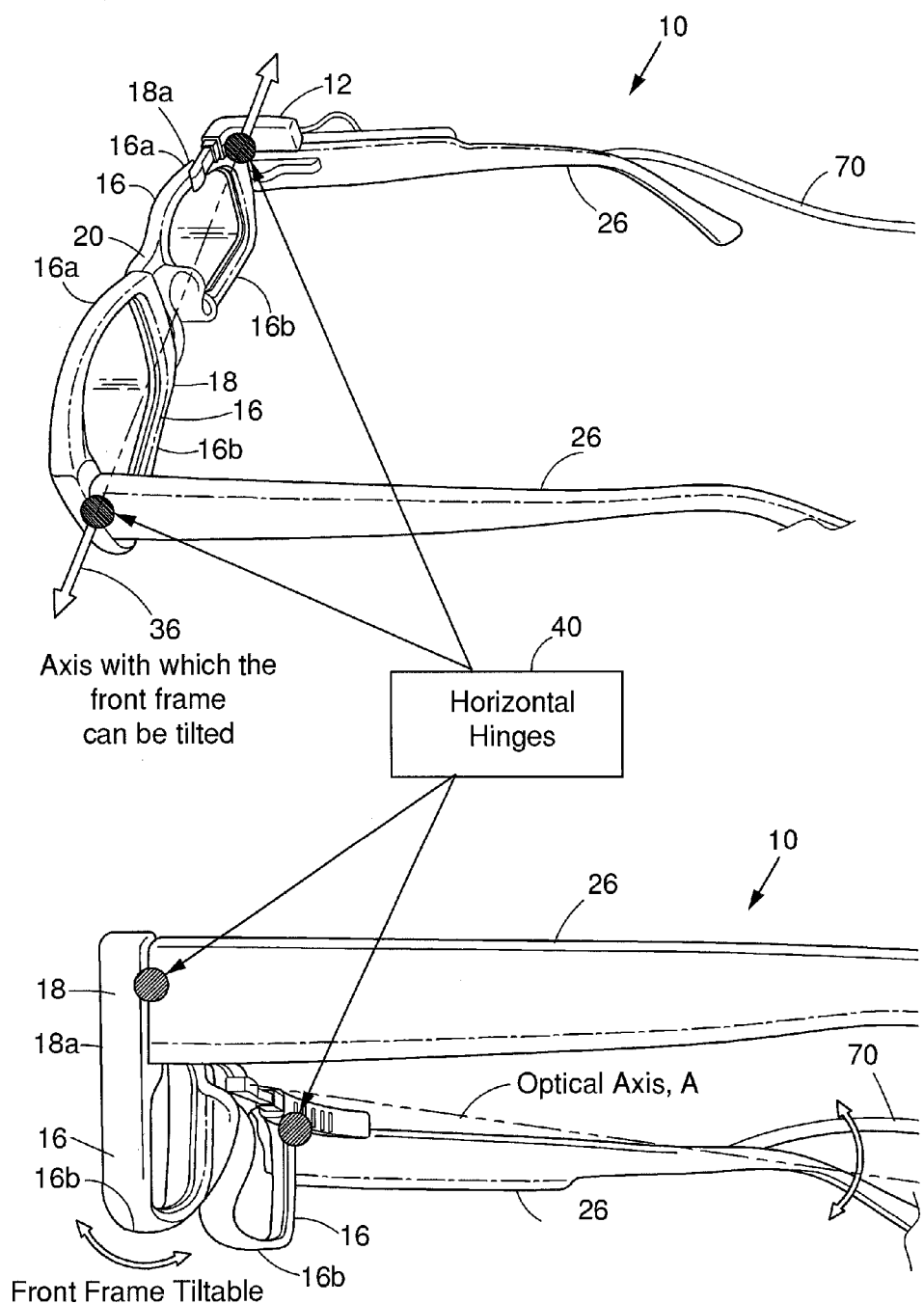
FIG. 11 are schematic drawings of an embodiment of the present invention electronic display having a tiltable front frame portion.
Figure 12:
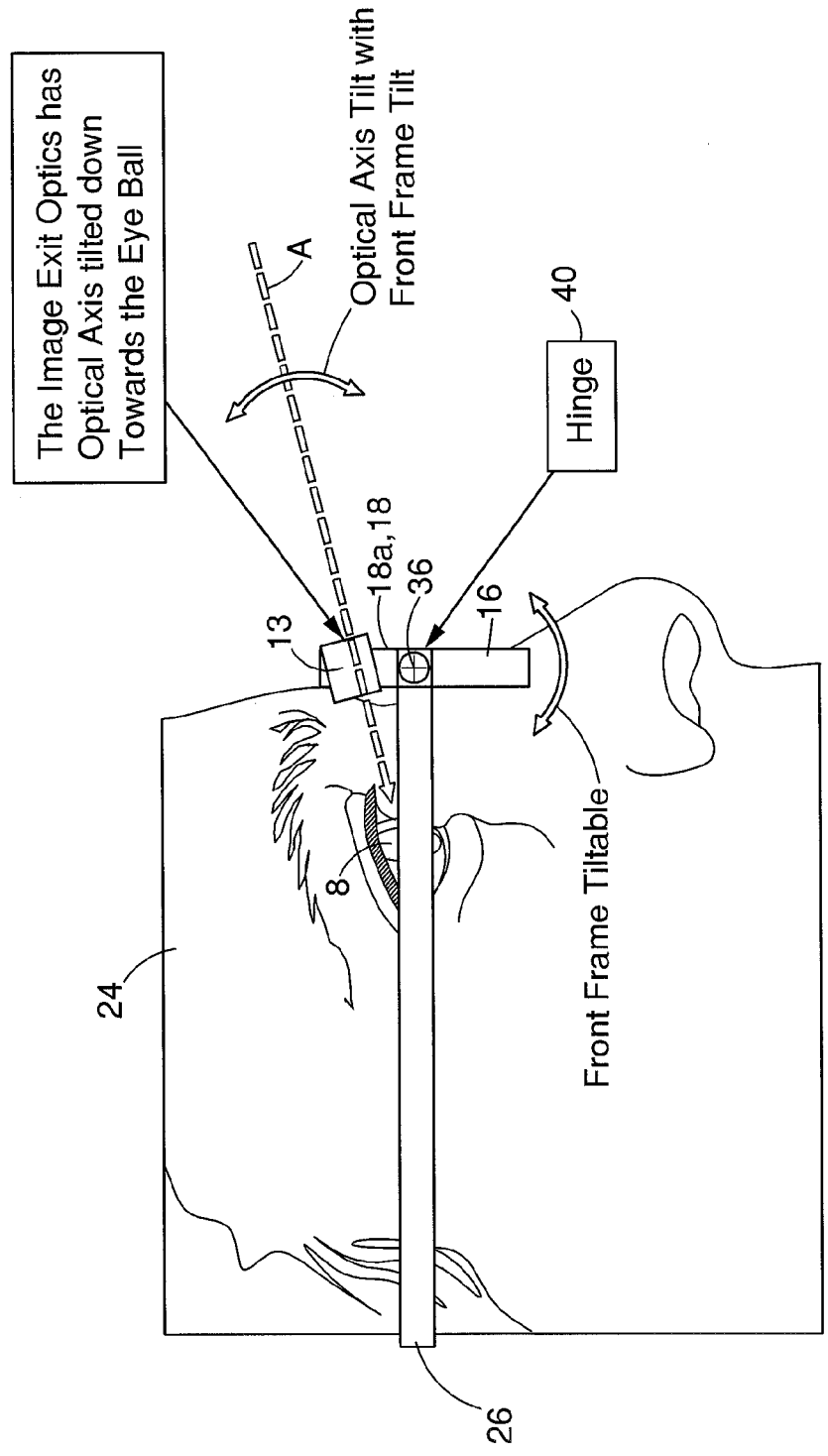
FIG. 12 is a schematic side view depicting tilting of the front frame portion.

Referring to FIGS. 11 and 12, the front frame portion 18a of frame 18 can have an adjustable tilt angle relative to the side frame portions 26. The optics 14 of the display module 12 can be fixed to or relative to the front frame portion 18a, and tilting the front frame portion 18a relative to the side frame portions 26 can have the effect of tilting the optical axis A of the display optics 14 towards the user's eyeball 8, such as upwardly or downwardly. The axis 36 about which the front frame portion 18 is tilted can be a lateral or horizontal axis connecting the front frame portion 18a to the two side frame portions 26 on opposite sides of the front frame portion 18a. The pivots or joints can be horizontal hinges or ball joints 40 connecting the front frame portion 18a to the side frame portions 26. In addition, sliding joints or features can be included for adjusting the height of the front frame portion 18a relative to the side frame portions 26 to adjust to different brow positions.

Figure 13:
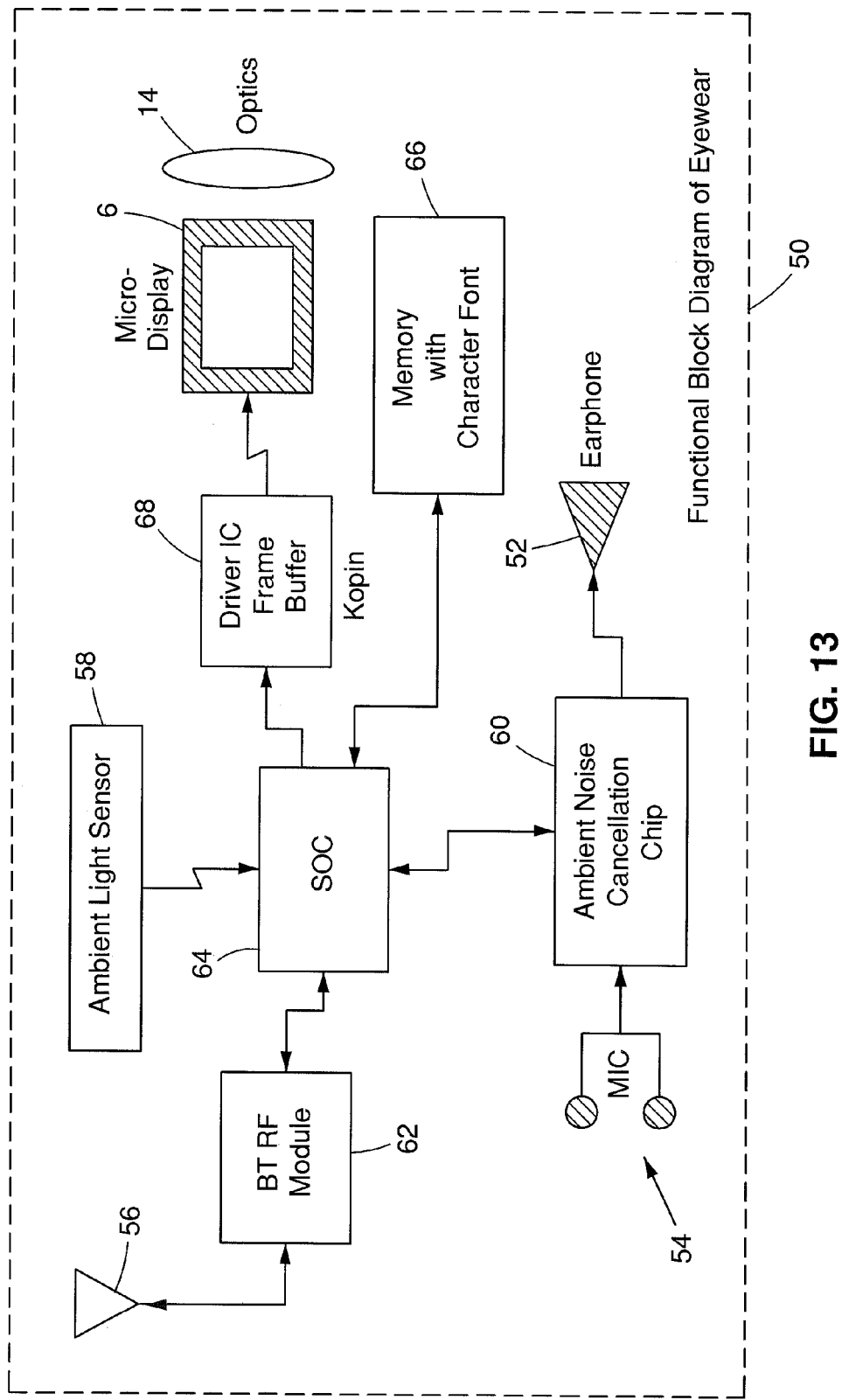
FIG. 13 is a schematic block diagram of an embodiment of an operation system.

FIG. 13 is a functional control block diagram of one embodiment of an eyewear control system, operation system or electronics 50 in the present invention, such as shown and described in U.S. Provisional Application No. 61/749,765, filed Jan. 7, 2013, the entire teachings of which are incorporated herein by reference. An electronics board and battery can be in the temple or stem 26 of the eyewear frame 18 and can be in front of the ear or behind the ear 28. The electronics can be in one temple and the battery can be in the other temple, with a flex cable imbedded inside the upper frame 16a and bridge 20 connecting the battery to the electronics. Audio output can be stereo with audio output on both sides of the temples or side frame portions 26. Audio output to the user can be implemented by bone conduction transducers, speakers, near-ear earphones, earbuds, 52 etc. The bone conduction material and element can be made adjustable to support different ear configurations or as a structural element that supports frame position to prevent slippage forward. The speaker volume can be automatically adjusted up or down depending on the ambient noise level. Multiple microphones 54 (two or three) can be embedded in either the frame 18 or the temple or side frame portion 26 for ambient noise canceling voice pickup via ambient nose cancellation electronics or chip 60. Electronics 50 can include radio link 56 to cell phone or other portable electronics, for audio, video, or image communication and can include a radio frequency module 62 which can be a Bluetooth module. An electronic compass can be provided to enable personal navigation applications. Display of other features including temperature, altitude, time, etc. can be included. This can be in sensors, or in an application that extracts data from the phone, or as part of software. Stand-alone sensor outputs can be used. An ambient light sensor 58 can be included so that the display brightness can be automatically adjusted. The electronics 50 can include a system on chip (SOC) 64, and can include memory with character font 66 and a driver IC frame buffer 68.

In some embodiments, the display module 12 can be inside the eyewear frame 18 closer to the eye 8 or can be outside the frame 18 further away from the eye, allowing prescription lenses 30 to be mounted within the frame 18 so that the user can view the images 15 in the optics 14 through the prescription lenses 30. The frame 18 can be mounted with prescription lenses 30 for people with myopia or a combination of transitional prescription lenses 30 for use in outdoor and indoor environments. Embodiments of the eyewear frame 18 can be designed so that the electronics, optics, and adjustment features are fixed, but a lens maker/optical house can develop a lens and frame structure that can snap into such an embodiment of the eyewear frame 18 as an option for providing a fixed complete frame with prescription lenses. There can be a standard frame with an optical prescription insert provided by a lens supplier. A camera 72 (FIG. 6C) can be included on the same side of the frame 18 as the display module 12, or can be included in housing 12a. This head-mounted display can also be binocular with two display modules 12 installed in symmetrical fashion, such as at two upper or lower locations indicated in FIGS. 1-3A. Electronics can receive video signals from a remote camera through the radio link, so that the display 12 on the frame 18 can be used as an electronic viewfinder of the remote camera unit.

Figure 14:
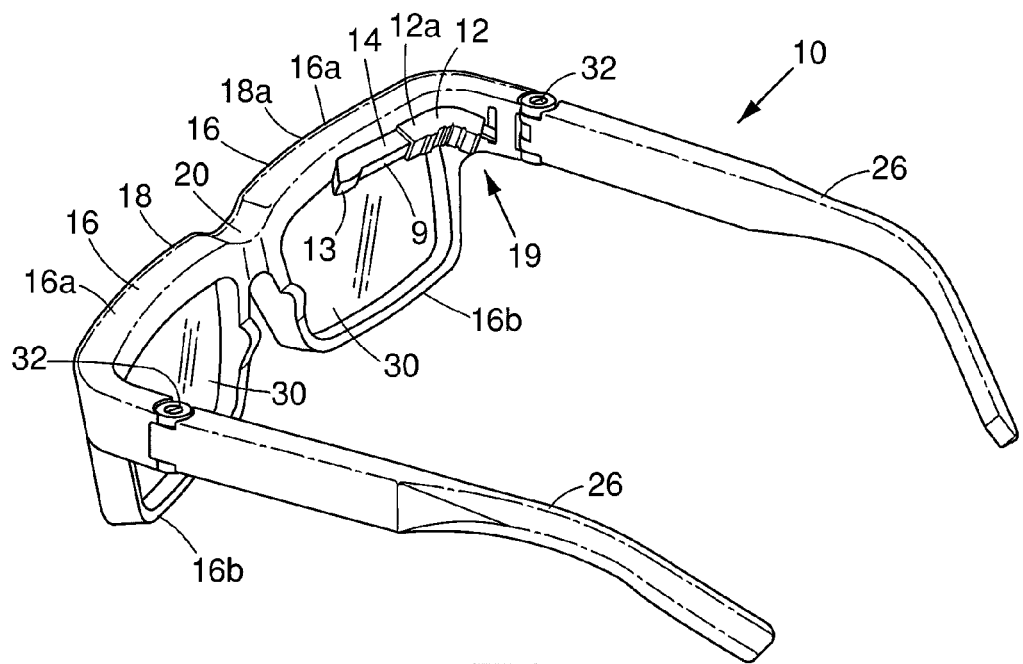
FIG. 14 is a perspective view of another embodiment of the present invention electronic display.
Figure 15:
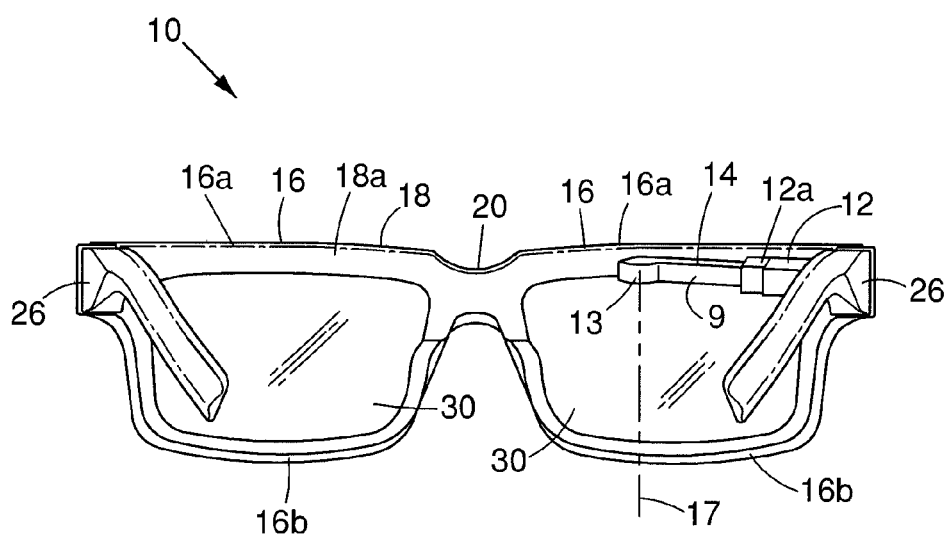
FIG. 15 is a rear view of the electronic display of FIG. 14.
Figure 16:
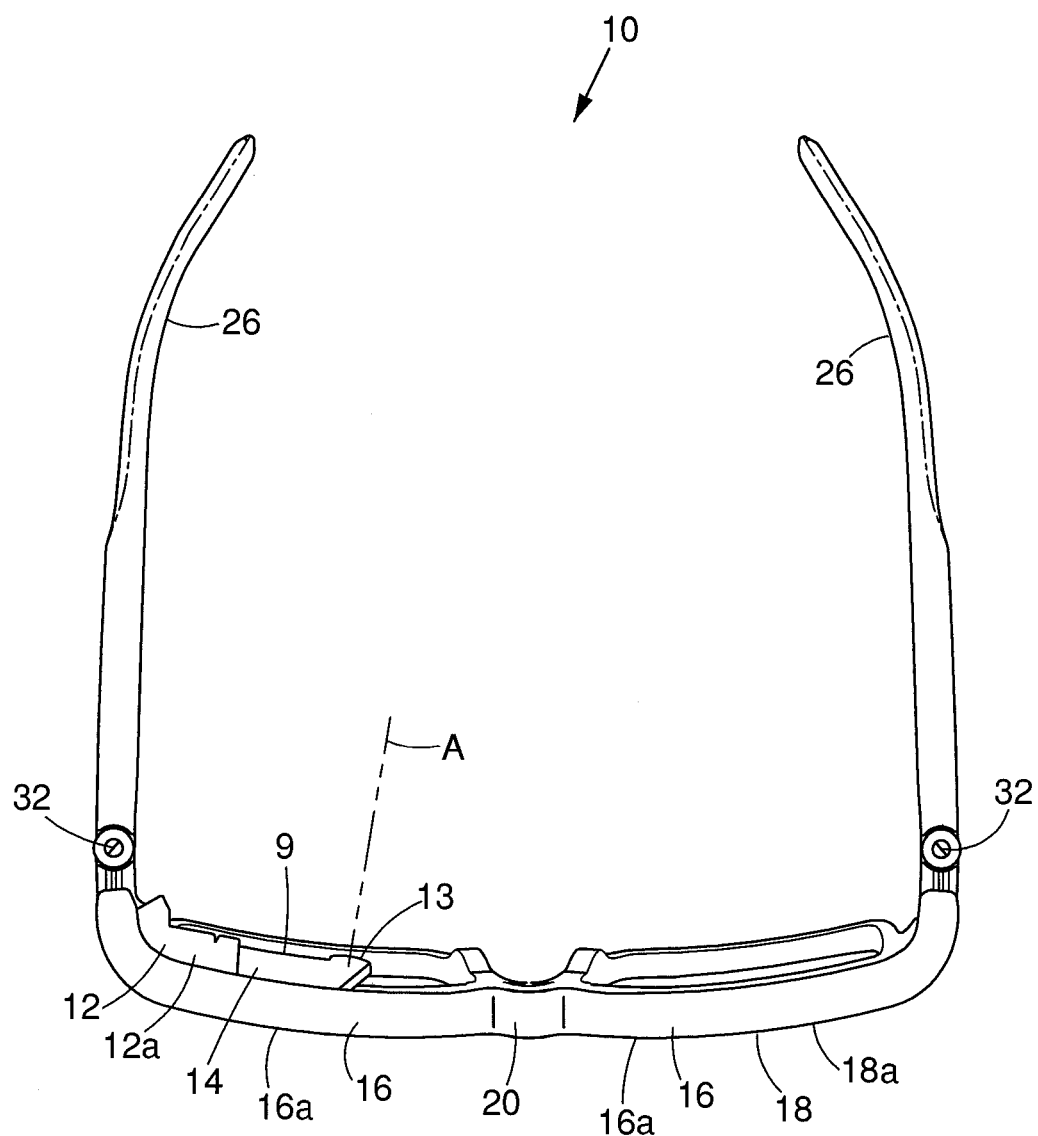
FIG. 16 is a top view of the electronic display of FIG. 14.

Referring to FIGS. 14-16, in some embodiments such as shown and described in U.S. application Ser. No. 29/462,871, filed Aug. 9, 2013, the entire teachings of which are incorporated herein by reference, the display module can be positioned behind or to the rear of the upper rim or frame portion 16a of a rim 16 of front frame portion 18a in a corner 19. It is possible to connect, fix, or attach a display module 12 to the frame 18 of an existing pair of eyeglasses to form an eyewear electronic display 10. The image exist window 13 can be angled or tilted slightly downwardly to angle or tilt the optical axis A to the user's 24 eye 8. The upper rim portion 16a can be thicker than the elongate portion 9 of the display module 12.

While this invention has been particularly shown and described with references to example embodiments thereof, it will be understood by those skilled in the art that various changes in form and details may be made therein without departing from the scope of the invention encompassed by the appended claims. For example, various features shown and described can be omitted or combined together.

For example, various features of the embodiments shown or disclosed can be omitted or combined together.

What is claimed is:

1. A wearable electronic display comprising:
   an eyewear frame having a first side frame portion in which the eyewear frame has the configuration of eyeglasses, with a front frame portion connected to the first side frame portion and having above eye and below eye frame members being upper and lower portions of two eyewear rims; and
   a display module mounted to the eyewear frame having a micro-display for generating images, the display module having an elongate portion with an image exit window positioned for directing viewable images to a user's eye, the elongate portion of the display module having a generally comparable width and/or thickness as the eyewear rims, while extending laterally generally along the level of one of the above eye and below eye frame members of the eyewear rims with the image exit window being positioned near or at a center of an eyewear rim, the display module being sized, shaped, positioned and configured to be blended into an appearance of said one of the above eye and below eye frame members so as to be not readily apparent or seen, and at the same time the image exit window already being in proper position for viewing.

2. The wearable electronic display of claim 1 in which the eyewear frame has a second side frame portion, and the front frame portion is connected between the first and second side frame portions.

3. The wearable electronic display of claim 2 in which the eyewear frame has a center bridge having at least one of an adjustable width for providing interpupillary distance adjustment, and an adjustable height for adjusting the height of the front frame portion relative thereto.

4. The wearable electronic display of claim 3 in which the center bridge includes at least one slider mechanism.

5. The wearable electronic display of claim 2 in which the front frame portion is pivotably secured to the first side frame portion and the second side frame portion by pivots about a horizontal axis for providing tilting of the front frame portion relative to the side frame portions for angular optical axis adjustment.

6. The wearable electronic display of claim 2 further comprising a second display module mounted to the eyewear frame for providing binocular viewing.

7. The wearable electronic display of claim 1 in which the image exit window is tilted in one of upwardly and downwardly directions for viewing.

8. The wearable electronic display of claim 1 in which the display module has an angular shaped portion that at least a portion thereof is positioned in a corner between the first side frame portion and the front frame portion.

9. The wearable electronic display of claim 1 in which the display module is mounted on the above eye frame member, extending laterally generally along the level of the above eye frame member, blending into the appearance of the above eye frame member.

10. A wearable electronic display comprising:
    an eyewear frame having the configuration of eyeglasses, including a front frame portion having two eyewear rims with upper and lower portions, the front frame portion being connected between first and second side frame members; and
    a display module mounted to the eyewear frame having a micro-display for generating images, the display module having an elongate portion with an image exit window positioned for directing viewable images to a user's eye, the elongate portion of the display module extending laterally generally along the level of the upper portion of one eyewear rim and having a generally comparable thickness as said eyewear rim, the image exit window being positioned near or at a center of said eyewear rim and tilted in a downwardly direction for viewing, the display module being sized, shaped, positioned and configured to be blended into an appearance of the upper portion of said one eyewear rim so as to be not readily apparent or seen, and at the same time the image exit window already being in proper position for viewing.

11. A method of viewing images comprising:
wearing a wearable electronic display, the wearable electronic display having an eyewear frame with a first side frame portion worn by a user in which the eyewear frame has the configuration of eyeglasses, with a front frame portion connected to the first side frame portion and having above eye and below eye frame members being upper and lower portions of two eyewear rims, a display module being mounted to the eyewear frame and having a micro-display for generating images; and
directing viewable images to an eye of the user from an image exit window positioned at an elongate portion of the display module, the elongate portion of the display module having a generally comparable width and/or thickness as the eyewear rims, while extending laterally generally along the level of one of the above eye and below eye frame members of the eyewear rims with the image exit window being positioned near or at a center of an eyewear rim, the display module being sized, shaped, positioned and configured to be blended into an appearance of said one of the above eye and below eye frame members so as to be not readily apparent or seen, and at the same time the image exit window already being in proper position for viewing.

12. The method of claim 11 further comprising providing the eyewear frame with a second side frame portion, and the front frame portion being connected between the first and second side frame portions.

13. The method of claim 12 further comprising providing the eyewear frame with a center bridge having at least one of an adjustable width for providing interpupillary distance adjustment, and an adjustable height for adjusting the height of the front frame portion relative thereto.

14. The method of claim 13 further comprising providing the center bridge with at least one slider mechanism.

15. The method of claim 12 further comprising pivotably securing the front frame portion to the first side frame portion and the second side frame portion with pivots about a horizontal axis for providing tilting of the front frame portion relative to the side frame portions for angular optical axis adjustment.

16. The method of claim 12 further comprising providing a second display module mounted to the eyewear frame for providing binocular viewing.

17. The method of claim 11 further comprising:
tilting the image exit window in one of upwardly or downwardly directions for viewing by the eye of the user.

18. The method of claim 11 further comprising providing the display module with an angular shaped portion, and positioning at least a portion thereof in a corner between the first side frame portion and the front frame portion.

19. The method of claim 11 wherein the display module is mounted on the above eye frame member, extending laterally generally along the level of the above eye frame member, blending into the appearance of the above eye frame member.

20. A method of viewing images comprising:
wearing a wearable electronic display, the wearable electronic display having an eyewear frame with the configuration of eyeglasses, including a front frame portion having two eyewear rims with upper and lower portions, the front frame portion being connected between first and second side frame members and worn by a user, a display module being mounted to the eyewear frame and having a micro-display for generating images; and
directing viewable images to an eye of the user from an image exit window positioned at an elongate portion of the display module, the elongate portion extending laterally generally along the level of the upper portion of one eyewear rim and having a generally comparable thickness as said eyewear rim, the image exit window being positioned near or at a center of said eyewear rim and tilted in a downwardly direction for viewing, the display module being sized, shaped, positioned and configured to be blended into an appearance of the upper portion of said one eyewear rim so as to be not readily apparent or seen, and at the same time the image exit window already being in proper position for viewing.

21. A wearable electronic display comprising:
an eyewear frame having a first side frame portion in which the eyewear frame has the configuration of eyeglasses, with a front frame portion connected to the first side frame portion and having at least one of above eye and below eye frame members being at least one of upper and lower portions of two eyewear rims; and
a display module mounted to the eyewear frame having a micro-display for generating images, the display module having an elongate portion with an image exit window positioned for directing viewable images to a user's eye, the elongate portion of the display module having a generally comparable width and/or thickness as the eyewear rims, while extending laterally generally along the level of one of the above eye and below eye frame members of the eyewear rims with the image exit window being positioned near or at a center of an eyewear rim, the display module being sized, shaped, positioned and configured to be blended into an appearance of said one of the above eye and below eye frame members so as to be not readily apparent or seen, and at the same time the image exit window already being in proper position for viewing.

22. The wearable electronic display of claim 21 in which the eyewear frame has a second side frame portion, and the front frame portion is connected between the first and second side frame portions.

23. The wearable electronic display of claim 22 in which the display module is positioned in one of two locations, either positioned to appear as part of one eyewear rim, and positioned behind the one eyewear rim.

24. The wearable electronic display of claim 23 in which the image exit window is tilted in one of upwardly and downwardly directions for viewing.

* * * * *